US012783501B2

(12) United States Patent
Lin et al.

(10) Patent No.: US 12,783,501 B2
(45) Date of Patent: Nov. 3, 2026

(54) MULTI-DOCUMENT ANALYSIS AND DATA VALIDATION DURING AN ELECTRONIC TRANSACTION WORKFLOW

(71) Applicant: FMR LLC, Boston, MA (US)

(72) Inventors: Chen Lin, Belmont, MA (US); Gregg Quimby, Groton, MA (US); Harold Alexander Bethune, Chapel Hill, NC (US); Sarah Jessica Albrecht, Raleigh, NC (US); Hui Su, West Roxbury, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/809,671

(22) Filed: Aug. 20, 2024

(65) Prior Publication Data

US 2026/0056938 A1 Feb. 26, 2026

(51) Int. Cl.
*G06F 16/23* (2019.01)

(52) U.S. Cl.
CPC ................................ *G06F 16/2379* (2019.01)

(58) Field of Classification Search
CPC .................................................. G06F 16/2379
See application file for complete search history.

(56) References Cited

U.S. PATENT DOCUMENTS

| | | | | |
|---|---|---|---|---|
| 2004/0030649 A1* | 2/2004 | Nelson | G06Q 20/40 | |
| | | | 705/44 | |
| 2008/0141033 A1* | 6/2008 | Ginter | G06Q 10/10 | |
| | | | 726/10 | |
| 2008/0147790 A1* | 6/2008 | Malaney | G06Q 10/00 | |
| | | | 709/203 | |
| 2012/0177295 A1* | 7/2012 | Gronau | G06V 30/12 | |
| | | | 382/218 | |
| 2012/0226600 A1* | 9/2012 | Dolev | G06V 10/7515 | |
| | | | 382/137 | |
| 2018/0350180 A1* | 12/2018 | Onischuk | G07C 13/00 | |
| 2021/0049305 A1* | 2/2021 | Wilson | G06F 21/64 | |

* cited by examiner

*Primary Examiner* — Kavita Stanley
*Assistant Examiner* — Lin Lin M Htay
(74) *Attorney, Agent, or Firm* — Cesari and McKenna, LLP

(57) ABSTRACT

Methods and apparatuses for multi-document analysis and data validation during an electronic transaction workflow include a server that selects a transaction template comprising (i) data fields required to execute the transaction and (ii) business logic for validating supporting documents. The server captures digital files that contain a representation of supporting documents, identifies text in each of the captured digital files, and validates the text identified in the captured digital files using business logic. The server submits a transaction execution request including the digital files to a transaction engine and transmits a response to the transaction request to a remote computing device.

26 Claims, 14 Drawing Sheets

100

200

300

400

| Transaction Type 500 | Data Field | Supporting Document Type(s) |
|---|---|---|
| **Beneficiary Validation** | Beneficiary Name | Birth Certificate<br>Social Security Card<br>Government Passport |
| | Beneficiary Date of Birth | Birth Certificate<br>Government Passport |
| | Beneficiary Social Security No. | Social Security Card |
| | Beneficiary Address | Utility Bill<br>Paycheck Stub<br>Driver's License |
| | Decedent Proof of Death | Death Certificate |
| **Hardship Withdrawal** | Name | Hardship Statement<br>Mortgage Statement |
| | Address | Hardship Statement<br>Mortgage Statement |
| | Requested Amount | Hardship Statement<br>Mortgage Statement |

500

FIG. 5

MULTI-DOCUMENT ANALYSIS AND DATA VALIDATION DURING AN ELECTRONIC TRANSACTION WORKFLOW

TECHNICAL FIELD

This application relates generally to methods and apparatuses, including computer program products, for multi-document analysis and data validation during an electronic transaction workflow.

BACKGROUND

Many organizations—such as corporations, banks, government and regulatory agencies, and financial services advisors—carry out complex transactions on behalf of customer that require submission and validation of multiple physical documents, each having several pages. To improve the transaction processing speed, organizations have moved away from requiring customers to send physical copies of such documents in favor of the use of digital documents, i.e., electronic files (images, PDFs) that comprise a copy of the underlying physical document. A user can easily capture a photo of the required document using their smartphone and upload the photo to the organization for review and processing.

However, this process can have several significant technical drawbacks. First, from the organization's perspective, transaction services representatives must handle dozens of digital documents each day to verify their authenticity and extract data used in the transaction. Often, these representatives struggle with inconsistent quality of uploaded images, often encountering blurry or poorly lit photos or scans. They spend valuable time requesting that the customers re-submit the digital documents and/or attempting to decipher unreadable text, all while manually transcribing visible details. This tedious process is error-prone and impacts representative productivity.

On the other side, customers are frequently unsure what standards need to be met for the digital documents they scan and upload, such as business rules their documents are being evaluated against or what image quality is acceptable for scans. When customers are asked to re-upload documents, they typically do not understand why the original uploads have not been accepted. Because customers often need to upload transaction documents during difficult times in their lives (e.g., financial hardship or family emergency), any delay in document processing can have serious consequences on their financial wellbeing.

In addition, many digital document-based transaction platforms are only web-based and do not take advantage of mobile devices. Furthermore, existing document capture mobile device applications are predominately limited to single-page document scanning, e.g., scanning a check or a bill. However, more intricate business transactions demand the upload of multiple documents, each having several pages. These existing platforms generally do not allow customers to upload an existing electronic version of the document but rather require the customer to manually print and scan. Also, these platforms do not validate interrelationships and data consistency between multiple different documents in a transaction.

SUMMARY

Therefore, what is needed are methods and systems for multi-document analysis and data validation during an electronic transaction workflow that provide for automated, intelligent document intake, review, and verification via a mobile device interface. The techniques described herein beneficially overcome the above-identified drawbacks of existing document-based transaction systems by not only confirming accuracy and validity of each uploaded document in isolation, but also validating interrelationships among multiple documents included in a single transaction using dynamic business logic and document data constraints. In addition to the above, the techniques described herein realize other technical improvements, such as:

Business Logic Outlining: the methods and systems provide clarity to end users and system administrators on required documents and their logical relationships for a given transaction (e.g., a valid driver's license and Social Security number (SSN) for beneficiary verification);

Metadata Provision: before requesting documents, the methods and systems leverage stored data about the individual user requesting the transaction. For example, if certain user details (e.g., Social Security number) are already known, the system does not request corresponding document proof from the end user but instead retrieves and validates the stored data.

Guided and Standardized Document Uploads: in addition to capturing digital documents, the methods and systems guide users on best practices for uploads and provide instant feedback on extracted data validity. This empowers users to make an informed decision to upload an electronic document directly or to capture a photo of a document to ensure satisfactory quality.

Document Interrelation Assurance: the methods and systems validate that all uploaded documents are coherent (e.g., matching names across a driver's license and a Social Security card) and ensure that the documents and data contained therein fulfill the transaction criteria.

In summary, the methods and systems described herein provide a powerful document uploading tool designed to streamline business transactions that require image uploads of documents, such as passports, driver's licenses, SSN cards, utility bills, and more. The methods and systems actively monitor image quality during the image capture process, providing real-time feedback to end users for optimizing clarity and legibility. Upon image capture, the methods and systems recognize the type of document, extract key information from the document, validate transaction business logic and constraints, and allow users to review and edit the extracted data. When a document is uploaded, the system receives a high-quality image alongside human-verified data types and extracted values. This dual layer of information ensures faster downstream processing and reduced back-and-forth with end users, positioning the present methods and systems as a significant asset in internal operations by improving customer satisfaction and engagement.

The invention, in one aspect, features a computer system for multi-document analysis and data validation during an electronic transaction workflow. The system includes a server computing device with a memory for storing computer-executable instructions and a processor that executes the computer-executable instructions. The server computing device selects a transaction template for a transaction request received from a remote computing device, the transaction template comprising (i) a plurality of data fields required to execute the transaction, each data field associated with one or more supporting documents and (ii) business logic for validating the supporting documents. For each required data field in the transaction template, the server computing device captures one or more digital files that contain a representation of one of the supporting documents for the data field, identifies text in each of the captured digital files that corresponds to the data field, and validates the text identified in the captured digital files using the business logic for the transaction template, including comparing the text identified in each of the captured digital files to determine consistency of the text across the captured digital files. The server computing device submits a transaction execution request including the digital files to a transaction engine when the text identified in the captured digital files is validated. The server computing device transmits a response to the transaction request to the remote computing device.

The invention, in one aspect, features a computerized method of multi-document analysis and data validation during an electronic transaction workflow. A server computing device selects a transaction template for a transaction request received from a remote computing device, the transaction template comprising (i) a plurality of data fields required to execute the transaction, each data field associated with one or more supporting documents and (ii) business logic for validating the supporting documents. For each required data field in the transaction template, the server computing device captures one or more digital files that contain a representation of one of the supporting documents for the data field, identifies text in each of the captured digital files that corresponds to the data field, and validates the text identified in the captured digital files using the business logic for the transaction template, including comparing the text identified in each of the captured digital files to determine consistency of the text across the captured digital files. The server computing device submits a transaction execution request including the digital files to a transaction engine when the text identified in the captured digital files is validated. The server computing device transmits a response to the transaction request to the remote computing device.

Any of the above aspects can include one or more of the following features. In some embodiments, before capturing the digital files, the server computing device determines that values for one or more of the required data fields in the transaction template are stored in a database. In some embodiments, validating the text identified in the captured digital files comprises comparing the text identified in each of the captured digital files to the stored values for the required data fields to determine consistency of the text with the stored values.

In some embodiments, before capturing the digital files, the server computing device determines that one or more other digital files containing a representation of one of the supporting documents for the transaction template are stored in a database. In some embodiments, the server computing device identifies text in the stored digital files that corresponds to the data field, and validates the text identified in the captured digital files and the stored digital files using the business logic for the transaction template, including comparing the text identified in each of the captured digital files and the stored digital files to determine consistency of the text across all of the digital files.

In some embodiments, capturing one or more digital files that contain a representation of one of the supporting documents for the data field comprises transmitting an upload request for at least one of the digital files from the remote computing device and receiving one or more of the digital files from the remote computing device in response to the upload request. In some embodiments, the digital files received from the remote computing device comprise a digital image captured by a camera of the remote computing device, or an electronic document uploaded from a storage module of the remote computing device. In some embodiments, identifying text in each of the captured digital files that corresponds to the data field comprises recognizing the text in each of the captured digital files using optical character recognition (OCR). In some embodiments, for each captured digital file, the server computing device classifies each page of the digital file according to a document type.

In some embodiments, validating the text identified in the captured digital files using the business logic for the transaction template comprises converting the business logic for validating the supporting documents into one or more one or more constraints using one or more of a large language model or a decision tree-based system, and applying the constraints to the text identified in the captured digital files to determine the consistency of the text across the captured digital files. In some embodiments, when the text identified in the captured digital files is not validated, the server computing device displays a message on the remote computing device requesting resubmission of one or more of the digital files from a user of the remote computing device. In some embodiments, the message is generated by the server computing device using one or more of a large language model or a decision tree-based system as applied to the consistency determination of the text across the captured digital files. In some embodiments, before validating the text identified in the captured digital files, the server computing device displays the identified text on the remote computing device for user review.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a diagram of an exemplary data structure that defines data fields and supporting documents for transaction templates.

DETAILED DESCRIPTION

Figure 1:
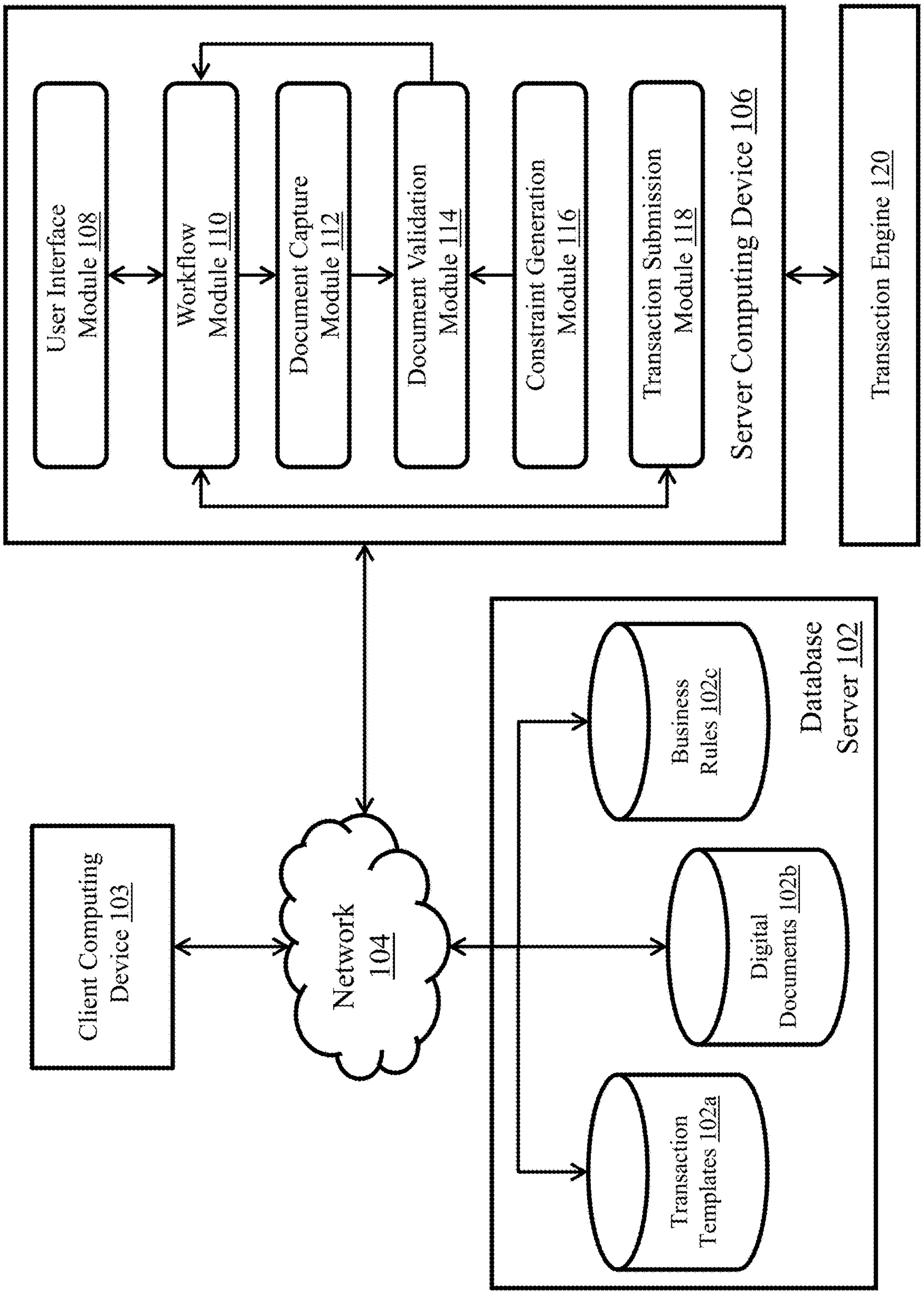
FIG. 1 is a block diagram of a system for multi-document analysis and data validation during an electronic transaction workflow.

FIG. 1 is a block diagram of system 100 for multi-document analysis and data validation during an electronic transaction workflow. System 100 includes transaction templates database 102*a*, digital documents database 102*b*, validation rules database 102*c*, client computing device 103, communications network 104, server computing device 106 that includes user interface module 108, workflow module 110, document capture module 112, document validation module 114, and constraint generation module 116.

Databases 102*a*, 102*b*, 102*c* are located on a single database server computing device 102 (or in some embodiments, on a plurality of database server computing devices) coupled to server computing device 106 and are configured to receive, generate, and store specific segments of data relating to the process of multi-document analysis and data validation during an electronic transaction workflow as described herein. In some embodiments, at least a portion of databases 102*a*, 102*b*, 102*c* can be integrated with server computing device 106 or be located on a separate computing device or devices (i.e., database server 102). Databases 102*a*, 102*b*, 102*c* can be configured to store portions of data used by the other components of system 100, as will be described in greater detail below. In some embodiments, databases 102*a*, 102*b*, 102*c* are located in a cloud storage infrastructure comprising one or more nodes accessible by server computing device 106.

Transaction templates database 102*a* includes data, metadata, and programmatic instructions relating to transaction workflows that can be executed by system 100. Generally, a transaction template defines a particular transaction workflow that can be executed by system 100. Exemplary transactions can include, but are not limited to, beneficiary validation and hardship withdrawal. Each transaction template comprises a transaction type, i.e., a unique identifier for the transaction workflow, as well as identification of one or more data fields that are required to be validated in order to successfully complete the transaction workflow. Each data field is associated with one or more digital document types that can be used to validate the corresponding data field. In some embodiments, a transaction template can comprise a data structure (e.g., database table, .xml file, .json file) stored in database 102*a* that contains the above-referenced information for retrieval and processing by modules 108-116 of server computing device 106. In some embodiments, when an end user initiates a transaction workflow using system 100, transaction templates database 102*a* can generate and store a copy of the transaction template for the particular transaction that contains information (e.g., data values, user profile information, user account information) specific to the end user. As a result, if the user cannot complete the transaction workflow in a single session, server computing device 106 can store the template copy for the end user's transaction and later retrieve the template copy (with previously saved information) when the end user is able to continue the workflow. In some embodiments, the transaction template also defines the steps of the transaction workflow in a state diagram data structure so that modules 108-116 can track the end user's progress through the workflow.

Digital documents database 102*b* includes a plurality of digital documents in one or more defined file formats. In some embodiments, database 102*b* can store digital documents as Portable Document Format™ (PDF) files, image files (e.g., .jpg, .png, .tiff, or other type of image format), or other digital document formats. In some embodiments, a digital document can be stored as a plurality of separate files (e.g., image files where each image corresponds to a single page of the digital document) or as a single file that comprises all pages of the digital document. In some embodiments, each digital document file (or each page of the digital document) can be assigned a classification value or label that relates to the type of document stored in the file.

Business rules database 102*c* includes a plurality of document processing rules, document validation rules, and transaction workflow processing rules used by server computing device 106 to analyze and validate the content and structure of a digital document as related to document requirements for a transaction workflow. In some embodiments, the rules stored in database 102*b* comprise business logic in the form of programmatic instructions that, when executed by modules 108-116 of server computing device 106, operate to analyze data and/or metadata associated with a digital document to verify, e.g., that the document content (i.e., the data values and text contained in the document) and structure (i.e., existence of data fields) appears as expected for the given document type and/or end user. In addition, the rules can comprise business logic in the form of programmatic instructions that, when executed by modules 108-116 of server computing device 106, operate to carry out specific steps of an electronic transaction workflow as it pertains to certain digital documents either provided by the end user or stored in database 102*b*. In some embodiments, the rules can represent business objectives or requirements, data validation requirements, compliance standards, privacy requirements, document structure or formatting preferences, file definitions, or other types of guidelines that govern the appearance, content, and/or structure of a digital document. In some embodiments, the rules can comprise a corpus of structured and/or unstructured text (e.g., written in human-readable language) that is converted into programmatic instructions by workflow module 110 during execution of the transaction workflow.

Client computing device 103 connect to the communications network 104 in order to communicate with server computing device 106 to provide input and receive output relating to the process for multi-document analysis and data validation during an electronic transaction workflow as described herein. Client computing device 103 can be coupled to a display device (not shown), such as a monitor or screen. For example, client computing device 103 can provide a graphical user interface (GUI) via the display device to a user of the corresponding device that presents output resulting from the methods and systems described herein and receives input from the user for further processing. In some embodiments, client computing device 103 is associated with an end user that desires to initiate and/or provide input to an electronic transaction workflow using one or more digital documents, such as a customer or end user, and device 103 can retrieve, receive, and/or display the digital documents to the end user as part of the overall electronic transaction workflow.

Exemplary client computing devices 103 include but are not limited to desktop computers, laptop computers, tablets, and mobile devices (e.g., smartphones). It should be appreciated that other types of computing devices that can connect to the components of the system 100 can be used without departing from the scope of invention. Although FIG. 1 depicts a single client computing device 103, it should be appreciated that system 100 can include any number of client computing devices.

Communications network 104 enables database server 102 with databases 102*a*, 102*b*, and 102*c*, client computing device 103, and server computing device 106 to communicate with each other. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on one or more processors and interact with memory modules of server computing device 106, to receive data from other components of system 100, transmit data to other components of system 100, and perform functions for multi-document analysis and data validation during an electronic transaction workflow as described herein. Server computing device 106 includes several computing modules 108, 110, 112, 114, 116 that execute on one or more processors of server computing device 106. In some embodiments, modules 108, 110, 112, 114, 116 are specialized sets of computer software instructions programmed onto one or more dedicated processors in the server computing device 106 and can include specifically designated memory locations and/or registers for executing the specialized computer software instructions.

Although modules 108, 110, 112, 114, 116 are shown in FIG. 1 as executing within the same server computing device 106, in some embodiments the functionality of modules 108, 110, 112, 114, 116 can be distributed among a plurality of server computing devices. As shown in FIG. 1, server computing device 106 enables modules 108, 110, 112, 114, 116 to communicate with each other to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 108, 110, 112, 114, 116 is described in detail below.

Figure 2:
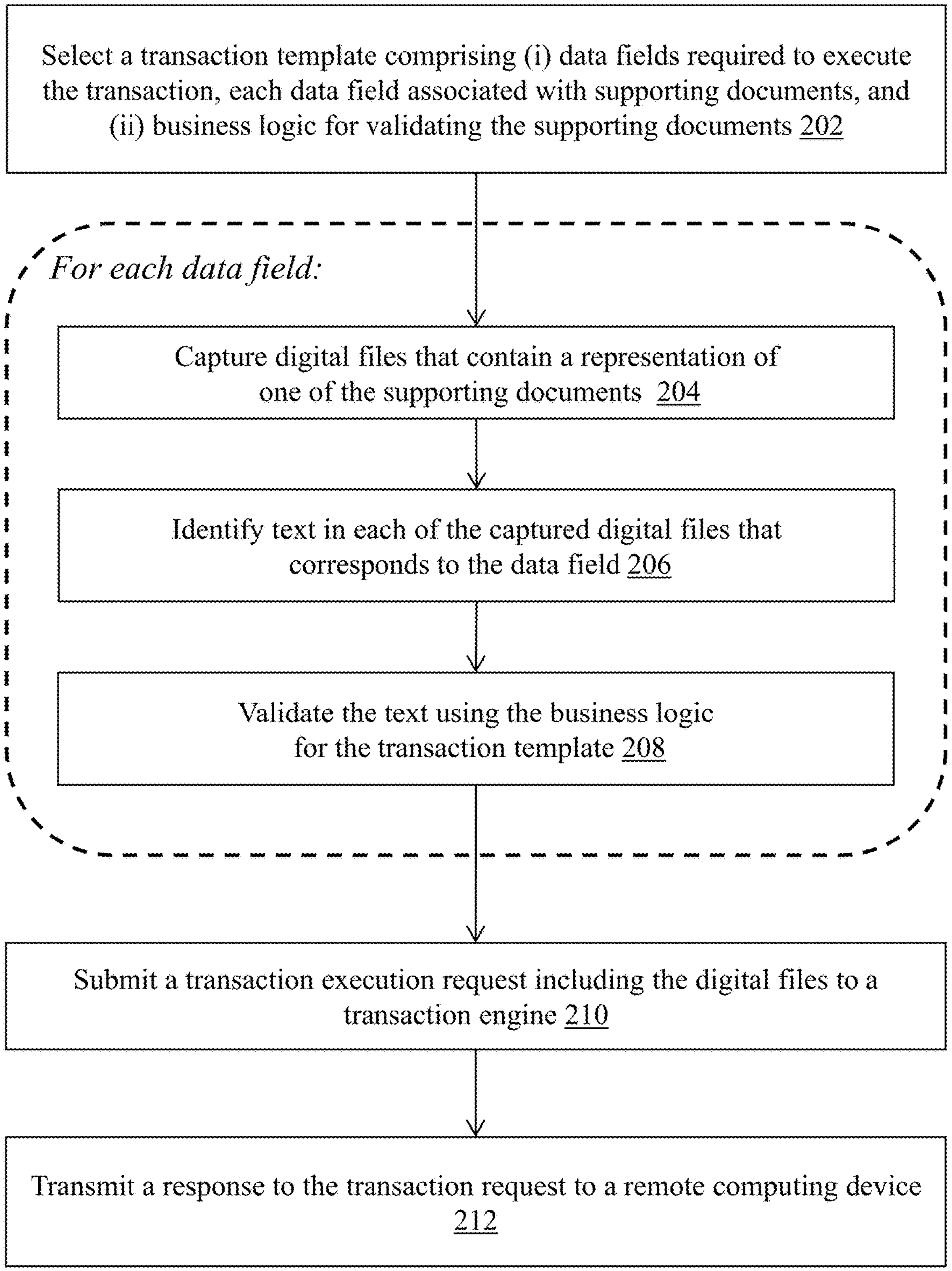
FIG. 2 is a flow diagram of a computerized method of multi-document analysis and data validation during an electronic transaction workflow.

FIG. 2 is a flow diagram of a computerized method 200 of multi-document analysis and data validation during an electronic transaction workflow, using system 100 of FIG. 1. Generally, electronic transaction workflows facilitated by system 100 require the receipt and validation of certain digital documents. As one example, a user at client computing device 103 may utilize system 100 to initiate a beneficiary validation transaction to transfer ownership of an account upon the death of the primary account holder (which may require submission of a valid death certificate, and documents to prove beneficiary identity and residence address). As another example, a user at client computing device 103 may utilize system 100 to initiate a transaction for a hardship withdrawal from the end user's retirement account due to a mortgage foreclosure notice (which may require submission of valid user identity documents, such as a birth certificate or driver's license, and supporting documents to prove the hardship (e.g., mortgage statement)). It should be appreciated that system 100 can facilitate any number of different electronic transactions, and system 110 is not limited to the transaction examples provided herein.

Figure 3:
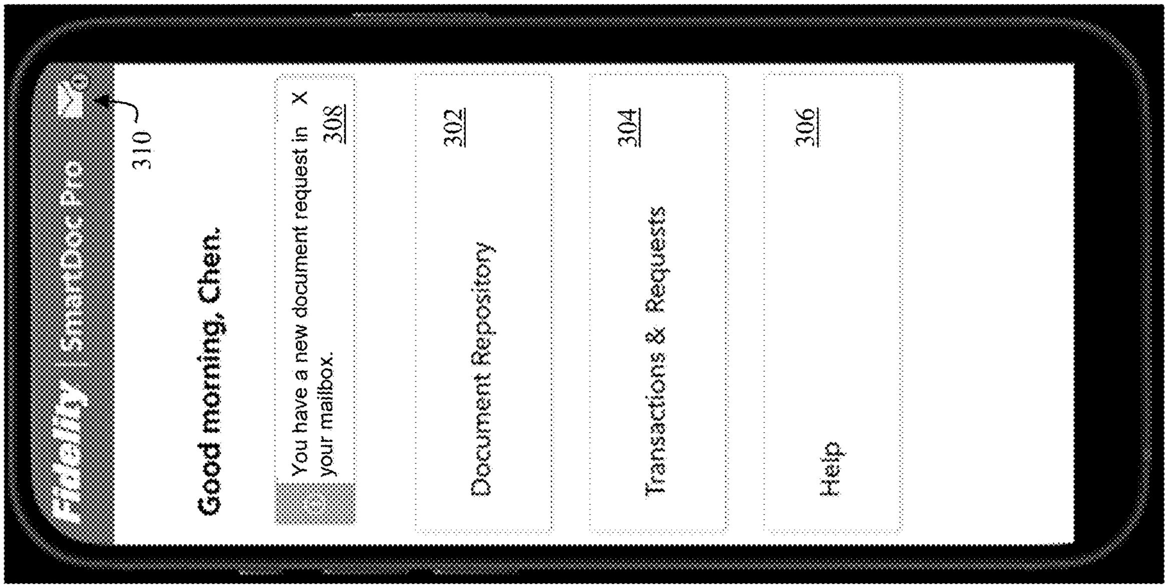
FIG. 3 is a diagram of an exemplary landing screen user interface generated upon successful authentication to the server computing device.

The user at client computing device 103 opens browser software and establishes a connection to user interface (UI) module 108 of server computing device 106, which provides an application interface and functionality for initiating and/or continuing with one or more electronic transaction workflows. In some embodiments, the user authenticates to server computing device 106 via one or more authentication credentials to gain access to the electronic transaction workflow interface. The user then provides input to UI module 108 via client computing device 103 to initiate one or more electronic transaction workflows. FIG. 3 is a diagram of an exemplary landing screen user interface 300 generated by UI module 108 upon the user's successful authentication to server computing device 106. As shown in FIG. 3, user interface 300 displays UI elements 302, 304, 306 which can be selected by the user to access various functionality provided by server computing device 106. Element 302 can be activated to display a list of stored digital documents associated with the user—for example, the user may have previously uploaded one or more digital documents to database 102*b*, and these digital documents can be linked to, e.g., a user profile for the end user. Therefore, upon the user successfully authenticating to server computing device 106 as described above, UI module 108 can retrieve the user profile and any stored digital documents associated with the profile from database server 102. When the user activates element 302, UI module 108 can generate another user interface that displays a list of available digital documents.

Element 304 can be activated by the user to initiate a new electronic transaction workflow or resume an in-process electronic transaction workflow, as will be described in greater detail below. Element 306 can be activated by the user to view information (e.g., frequently asked questions, guides, contact information) that assists the user in navigating the user interface of the application and/or conducting the electronic transactions described herein. User interface 300 also includes notification area 308 and inbox icon 310 that provide, e.g., alert notifications for pending items to be viewed and actioned by the user. For example, the user may have one or more in-process electronic transaction workflows that cannot be completed until the user provides necessary information and/or digital documents. Notification area 308 and/or inbox icon 310 can inform the user upon logging in that such action items are awaiting their response.

Figure 4:
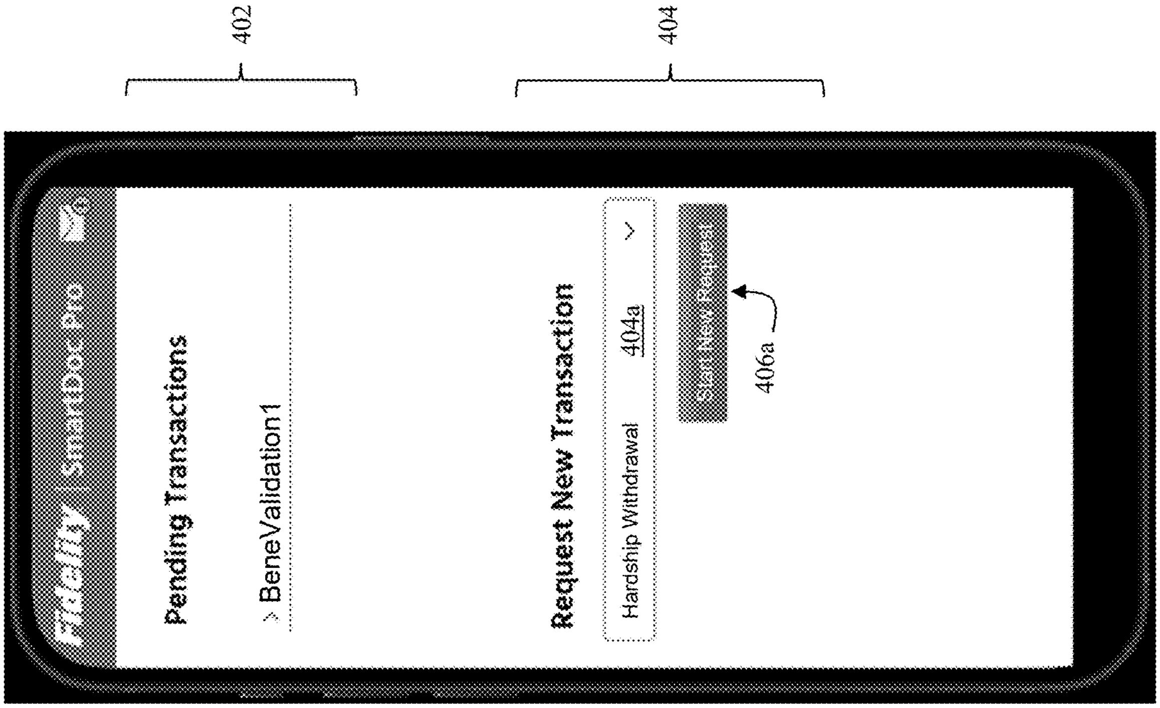
FIG. 4 is a diagram of an exemplary user interface to enable an end user to initiate a new electronic transaction workflow or continue with an existing electronic transaction workflow.

The user at client computing device 103 decides to initiate a new workflow transaction and interacts with element 304 of user interface 300. FIG. 4 is a diagram of an exemplary user interface 400 generated by UI module 108 to enable the end user to initiate a new electronic transaction workflow or continue with an existing electronic transaction workflow. As shown in FIG. 4, user interface 400 comprises two sections: sections 402 and 404. Section 402 provides an interactive list of in-process transactions for the end user, where the user can select one of the listed transactions (e.g., 'Bene Validation1'). Upon selection by the user, server computing device 106 can load the transaction workflow details and present a user interface on client computing device 103 to enable the user to continue with the transaction workflow. Section 404 provides interface elements 404*a*, 404*b* to allow the user to start a new transaction workflow. Element 404*a* is a drop-down menu that contains a list of available transactions that the user can initiate. Upon selecting a desired transaction from the drop-down menu 404*a*, the user can interact with element 404*b* to start the transaction workflow using server computing device 106.

Turning back to FIG. 2, workflow module 110 receives indicia of the selected transaction from UI module 108. Module 110 selects (step 202) a transaction template associated with the transaction from templates database 102*a*. In some embodiments, the transaction template comprises one or more data structures that define (i) a plurality of data fields required to execute the transaction, each data field associated with one or more supporting documents and (ii) business logic for validating the supporting documents. In some embodiments, the data fields can include, but are not limited to, numeric values, alphanumeric values, dates, text strings, multi-part fields, and/or binary values (e.g., true/false, yes/no, valid/invalid). As an example, for a beneficiary validation transaction, the following data fields may be required for validation so that the transaction can be completed successfully: beneficiary name, beneficiary date of birth, beneficiary Social Security number, beneficiary address, and decedent proof of death. FIG. 5 is a diagram of an exemplary data structure 500 that defines data fields and supporting documents for transaction templates. As shown in FIG. 5, the data structure 500 is a table that includes a transaction type (column 502) identifying the unique transaction types. Each transaction type is associated with a plurality of data fields (column 504) that must be validated to complete the transaction workflow. Each data field is associated with one or more supporting document types (column 506) that can be analyzed by server computing device 106 as described herein to validate the corresponding data field.

Figure 6:
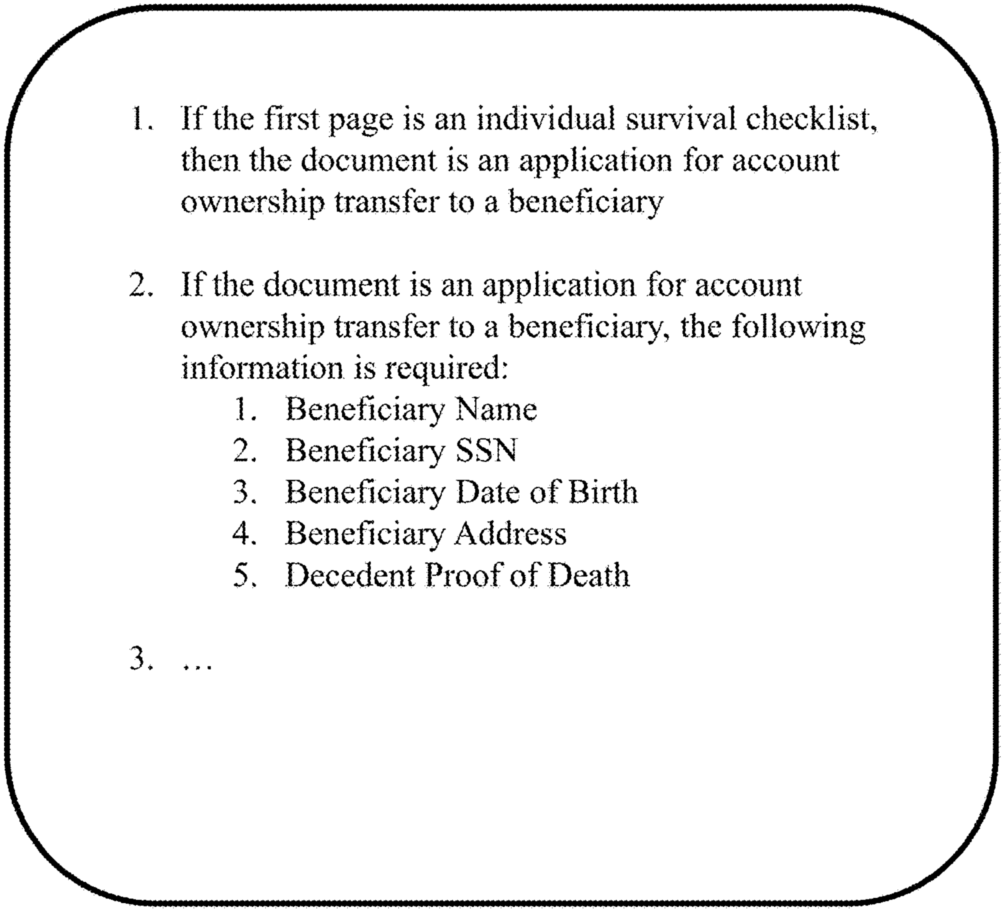
FIG. 6 is a diagram of an exemplary ruleset for a beneficiary validation transaction workflow.

In some embodiments, the business logic for validating the supporting documents is stored in database 102*c* for retrieval and execution by modules 108-116 during the transaction workflow processing described herein. As mentioned previously, the business logic is stored as a corpus of structured and/or unstructured text (e.g., rules written in human-readable language). Upon initiation of a transaction workflow, workflow module 110 retrieves the business logic from database 102*a* and converts the human-readable language into programmatic instructions that are executed by module 110. FIG. 6 is a diagram of an exemplary ruleset 600 for a beneficiary validation transaction workflow. As shown in FIG. 6, the ruleset 600 is composed in human-readable language and arranged in a structured format.

In some embodiments, UI module 108 is configured to generate a rules editor user interface for presentation to a user at a remote computing device. For example, the user can be a system administrator that is responsible for generating and configuring transaction rulesets to be used by system 100. The system administrator interacts with the rules editor to enter text corresponding to the rules for a particular transaction (as shown in FIG. 6) and store the text in business rules database 102*c*. In some embodiments, UI module 108 can leverage a large language model (LLM) to automatically generate the structured and/or unstructured text based upon input provided by the system administrator. In these embodiments, instead of entering the text, the system administrator can provide a prompt that enables an LLM to generate the corresponding ruleset text. For example, the prompt for a beneficiary validation transaction could be "Generate requirements for validating information on user identification documents to validate the identity of a beneficiary in an account ownership transfer transaction." Upon receiving the prompt, UI module 108 interfaces with an LLM model (e.g., via a model-specific API) to provide the prompt to the LLM model and receive the corresponding reply containing the human-readable structured and/or unstructured text of the ruleset. Exemplary LLMs that can be used by system 100 include, but are not limited to, GPT-4™ from OpenAI, Gemini™ from Google, and others.

After retrieving the transaction template including data fields and business logic as described above, workflow module 110 processes the transaction template to initialize the transaction workflow for the end user's requested transaction. In some embodiments, the transaction template processing performed by module 110 includes: i) determining whether one or more data values referenced in the transaction template are already stored for the end user; ii) determining whether one or more digital documents referenced in the transaction template are already stored for the end user; and iii) converting the business logic for the transaction template into one or more constraints used to validate data extracted from the digital documents.

As described above, the end user at client computing device 103 authenticates to server computing device 106 in order to initiate a new transaction workflow. During authentication, workflow module 110 can determine whether the end user is an existing customer by comparing the user authentication credentials to one or more user profiles stored in database server 102. Generally, a user profile can comprise data values for information about the end user (e.g., name, address, demographics, account details, historical transactions, etc.), as well as links to digital documents stored in database 102*b* that relate to the end user. When module 110 identifies user profile information corresponding to the end user, module 110 can retrieve the user profile and determine whether one or more of the data fields required for validation as part of the transaction workflow are contained in the user profile. For example, in the case of a beneficiary validation where the end user is the beneficiary requesting an account ownership transfer, workflow module 110 can determine that the end user has an existing user profile including his or her name and birth date. In addition, workflow module 110 can determine that the user profile is linked to a plurality of digital documents including a driver's license and a passport for the end user. Based upon the information stored in the user profile, workflow module 110 can automatically fill in the corresponding data fields (e.g., name, date of birth) in the beneficiary validation transaction workflow and then update the workflow state to indicate that these data fields have already been retrieved and validated—to eliminate the need to ask the end user to re-upload supporting digital documents and thereby streamline the transaction processing. Continuing with this example, the workflow is adjusted to request from the end user only digital documents to support proof of beneficiary address and decedent proof of death—because information and supporting documents that verify the end user's identity are already stored in system 100.

Figure 7:
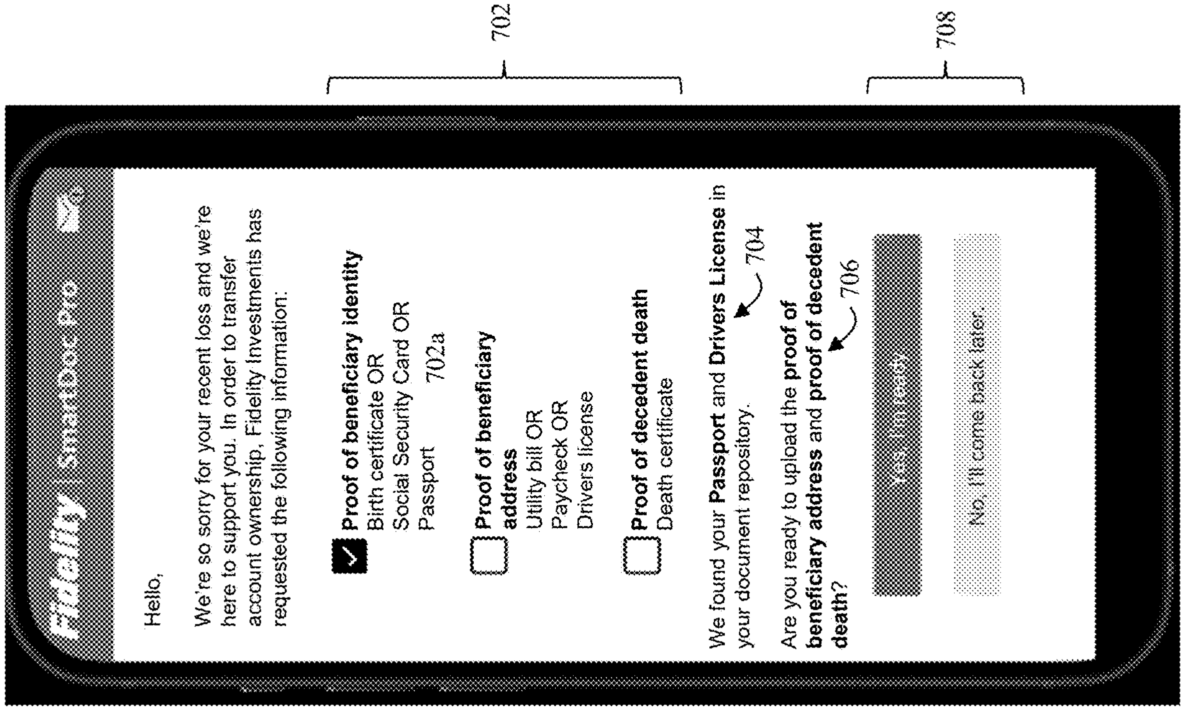
FIG. 7 is a diagram of an exemplary user interface after processing of user profile information for a beneficiary validation transaction is complete.

FIG. 7 is a diagram of an exemplary user interface 700 generated by UI module 108 for presentation to the end user at client computing device 103, after workflow module 110 has completed processing of the user profile information for a beneficiary validation transaction. As shown in FIG. 7, user interface 700 includes a list 702 of digital document types required to complete the transaction: proof of beneficiary identity, proof of beneficiary address, and proof of decedent death. Because the end user's profile already includes a validated name and date of birth (as captured from the user's driver's license/passport), list 702 indicates that proof of beneficiary identity is already satisfied (via checkbox 702*a*). User interface 700 informs the user that their document repository includes a copy of their passport and driver's license (704), with links that the user can activate to view the documents. Finally, user interface 700 requests (706) that the end user continue the workflow process by uploading proof of beneficiary and proof of decedent death (with supporting documents identified in list 702). The user can select one of the buttons 708 to either proceed with document upload or save the in-process transaction workflow and return later to complete the process.

Figure 8:
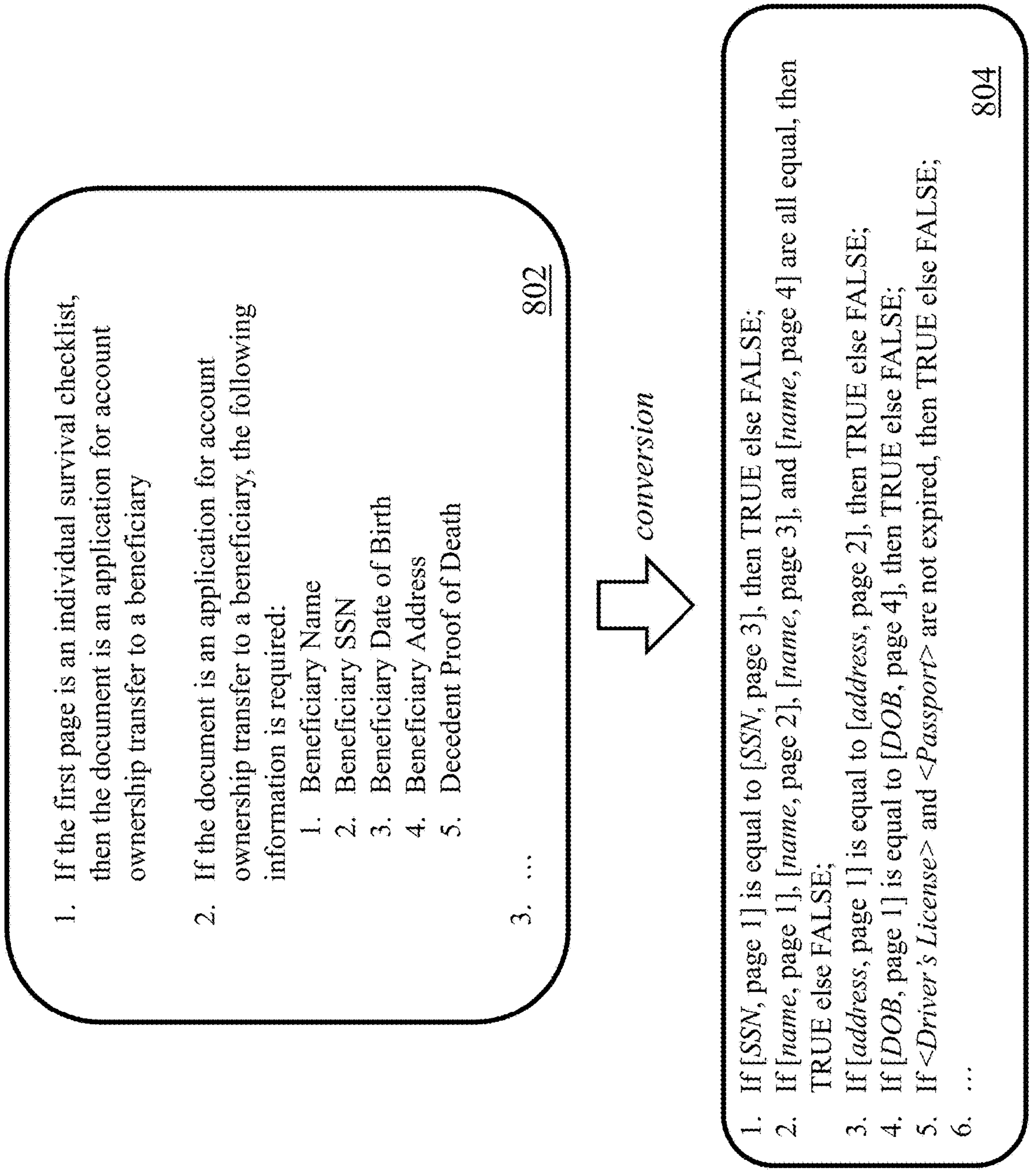
FIG. 8 is a diagram of an exemplary conversion of a text-based ruleset into constraints for evaluation of document data.

As mentioned above, workflow module 110 also converts the business logic for the transaction template into one or more constraints used to validate data extracted from uploaded digital documents. Generally, the constraints are applied by document validation module 114 to each page of the digital documents to evaluate extracted data for consistency and validity. FIG. 8 is a diagram of an exemplary conversion 800 of a text-based ruleset into constraints for evaluation of document data. As shown in FIG. 8, the text-based ruleset 802 (as seen in FIG. 6) is converted into a plurality of constraints 804 that can be evaluated by document validation module 114. As can be appreciated, each constraint is resolvable into a binary output (e.g., true or false). Some of the constrains reference certain data fields on specific pages of the uploaded document, while other constrains reference other supporting documents like the user's previously stored driver's license and passport. For example, one of the constraints requires that the SSN in page 1 of the beneficiary application document uploaded by the end user matches the SSN in page 3. If these two data values do not match, then the constraint resolves to 'false.'

Figure 9:
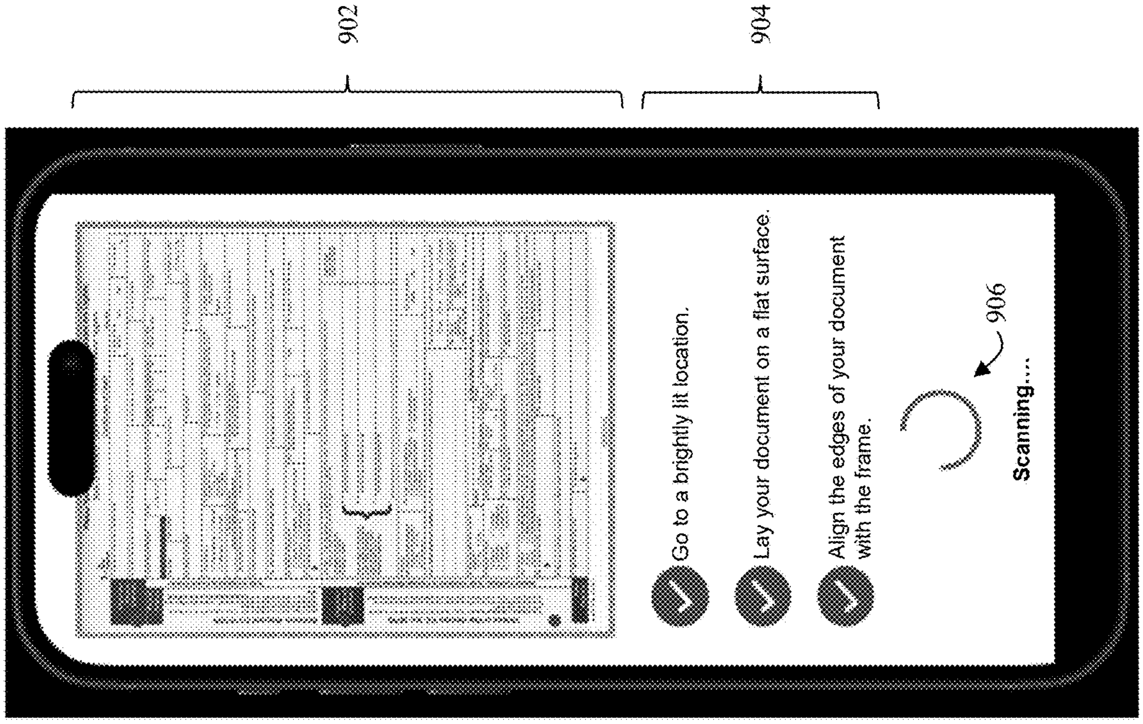
FIG. 9 is a diagram of an exemplary user interface for displaying a document capture window.

Turning back to FIG. 2, upon the end user deciding to continue with document upload, workflow module 110 instructs document capture module 112 to request digital documents from the end user that pertain to the incomplete document types in the template (i.e., proof of beneficiary and proof of decedent death). For each required data field in the transaction template, document capture module 112 captures (step 204) one or more digital files that contain a representation of one of the supporting documents for the data field. In some embodiments, document capture module 112 instructs the user to capture a digital image of each page of a physical document using a camera coupled to the client computing device 103 (such as a digital camera of a smartphone). For example, the end user can physically fill out and sign an account ownership transfer application, and then capture and upload a digital image of each page of the application as part of the transaction workflow. FIG. 9 is a diagram of an exemplary user interface 900 generated by UI module 108 for displaying a document capture window, based upon instructions received from document capture module 112. As shown in FIG. 9, user interface 900 includes a digital imaging area 902 that represents the view of the physical document as seen by the camera hardware of client computing device 103. User interface 900 also includes a set of instructions 904 that assists the end user in achieving optimal conditions (e.g., lighting, orientation, alignment, etc.) for capturing the digital images of the document. User interface 900 also includes indicator 906 that informs the user of the status of document scanning by document capture module 112. As can be appreciated, document capture module 112 can automatically evaluate the digital image captured by the camera using one or more image quality metrics (such as contrast, brightness, noise, blurriness, dimensions) to confirm that the image is sufficiently legible for processing as part of the transaction workflow. If the document image does not satisfy minimum thresholds for one or more of the image quality metrics, document capture module 112 can instruct the user (via UI module 108) to adjust the camera, physical document, and/or capture conditions and capture another image of the document. In some embodiments, the physical document may have one or more landmarks (such as barcodes, document IDs, watermarks, holograms or other optical verification devices, page numbers, or headers) printed on the document. Document capture module 112 can be configured to detect and validate these landmarks as part of the image capture process to confirm that the physical document is valid and the image of the document is complete (e.g., the document is not occluded or cut off, the document is a correct version, the document is not a forgery, etc.).

As can be appreciated, document capture module 112 can be configured to repeat the above-described document capture process for each of the digital documents required for successful completion of the transaction workflow. In some embodiments, instead of or in addition to capturing image files corresponding to each page of a physical document, the end user at client computing device 103 can upload an existing digital document file that is stored locally on client device 103. For example, the user may have a digital copy of their driver's license stored as, e.g., a .jpg or .pdf file on client device 103. Document capture module 112 can instruct UI module 108 to generate a user interface that enables the user to browse the file repository/disk drive of client computing device 103 and select the digital file for upload. Also, in some embodiments, the end user can upload a single digital file that contains a plurality of different document types.

In some embodiments, document capture module 112 analyzes the digital file(s) received from client computing device 103 and identifies (step 206) text in each of the captured digital file(s) that corresponds to the required data fields. In embodiments where the upload is a plurality of digital files each representing a separate page of the digital document, module 112 can link the files together as a single logical document and analyze each page according to the business rules/constraints. In embodiments where the upload is a single digital file containing multiple pages of the same document, module 112 can partition the single digital file into separate files for each page of the document and analyze the pages according to the business rules/constraints. In embodiments, where the upload is a single digital file containing pages from multiple document types, module 112 can partition the single digital file into separate files for each document type (and/or separate files for each page in each document) and analyze the pages/files according to the business rules/constraints.

Document capture module 112 identifies text in each of the captured digital files that corresponds to the data field using one or more image analysis and data extraction techniques. In some embodiments, module 112 can use any or all of the following techniques when identifying text in the captured digital files: optical character recognition (OCR), page classification, and entity extraction. It should be appreciated that these techniques can leverage natural language processing (NLP) algorithms to detect and parse text from digital documents. In some embodiments, document capture module 112 can apply one or more OCR techniques to each digital file to identify and extract relevant data fields for use in the transaction workflow. Exemplary OCR techniques and algorithms include, but are not limited to, i) traditional OCR algorithms (e.g., Textract™ available from Amazon Web Services) that convert each image into machine-encoded text for separate analysis by module 112 and ii) OCR-based NLP entity extraction algorithms (e.g., EntityRecognizer in spaCy NLP (available at spacy.io), Named Entity Recognition in Stanford CoreNLP (available at stanfordnlp.github.io)) that convert each image into machine-encoded text and also analyzes the machine-encoded text to identify context including specific data fields and data values. In some embodiments, module 112 can use OCR-free document understanding techniques to extract the relevant data fields and values from the document. Exemplary OCR-free document understanding techniques include, but are not limited to, a) Donut (as described in G. Kim et al., "OCR-free Document Understanding Transformer," arXiv:2111.15664v5 [cs. LG], Oct. 6, 2022, available at arxiv.org/pdf/2111.15664, which is incorporated herein by reference); and b) UDOP (as described in Z. Tang et al., "Unifying Vision, Text, and Layout for Universal Document Processing," arXiv.2212.02623v3 [cs. CV], Mar. 13, 2023, available at arxiv.org/pdf/2212.02623, which is incorporated herein by reference).

In some embodiments, document capture module 112 is configured to classify each page of a digital document file. For example, document capture module 112 can process each page of the digital document file using a trained machine learning classification model to generate a classification label for the document page. The classification label indicates the document type to which the page belongs (e.g., a label can be 'PASSPORT' or 'BIRTH CERTIFICATE'.) Exemplary machine learning classification models used by module can include, but are not limited to, a) traditional classification approaches such as Random Forest Classifier, k-nearest neighbor (KNN), support vector machine (SVM), and Naive Bayes classifier; b) transformer-based models, such as large language models; and c) OCR-free document classification (using Donut or UDOP, supra).

Figure 10A:
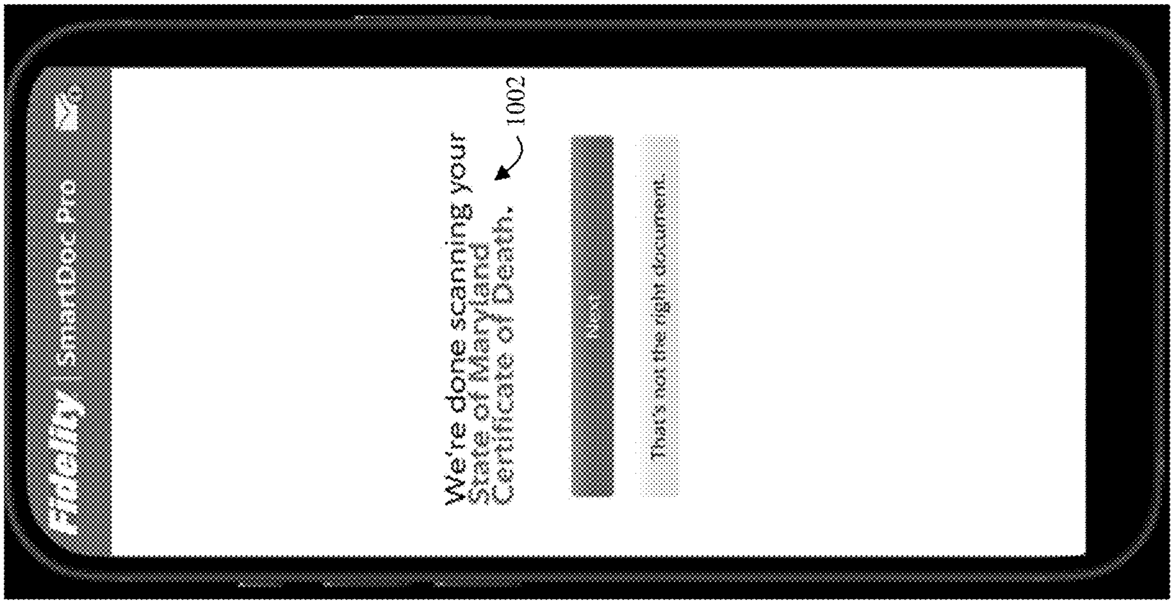
FIG. 10A is a diagram of an exemplary user interface depicting a notification message that a document scanning and validation process is complete.

After identifying relevant text in each digital document file and/or page of each file, document validation module 114 validates (step 208) the text identified in the captured digital files using the business logic for the transaction template. As described previously, the business logic can comprise one or more constraints generated by constraint generation module 116 from rulesets stored in database 102*c* for the corresponding transaction workflow. Module 114 evaluates each of the constraints using the extracted text/data values from the digital document(s) and determines whether the constraints are satisfied (i.e., the constraints resolve as 'True') or not (i.e., one or more constraints resolve as 'False'). For example, in an account ownership transfer transaction, the end user may upload a digital image of the decedent's death certificate as proof of death. In this example, one of the constraints is that the date of death is valid (i.e., not missing or in the future). Module 114 extracts the date of death from the digital document and analyzes the extracted date to determine whether it is in the past (i.e., valid) or in the future (i.e., invalid). For example, module 114 can compare the extracted date to the current date (and/or the date that the transaction was requested) to determine whether the date of death is valid. Once the document has being analyzed and processed by modules 112 and 114, user interface module 108 can display a user interface to inform the end user that document scanning and validation is complete. FIG. 10A is a diagram of an exemplary user interface 1000 depicting a notification message 1002 to the end user that the document scanning and validation process is complete. As shown in FIG. 10A, the message 1002 includes a document title ("State of Maryland Certificate of Death") that was extracted from the digital document as described above. The end user can quickly identify whether the document may need to be re-scanned (e.g., if the title displayed does not match the uploaded document).

Figure 10B:
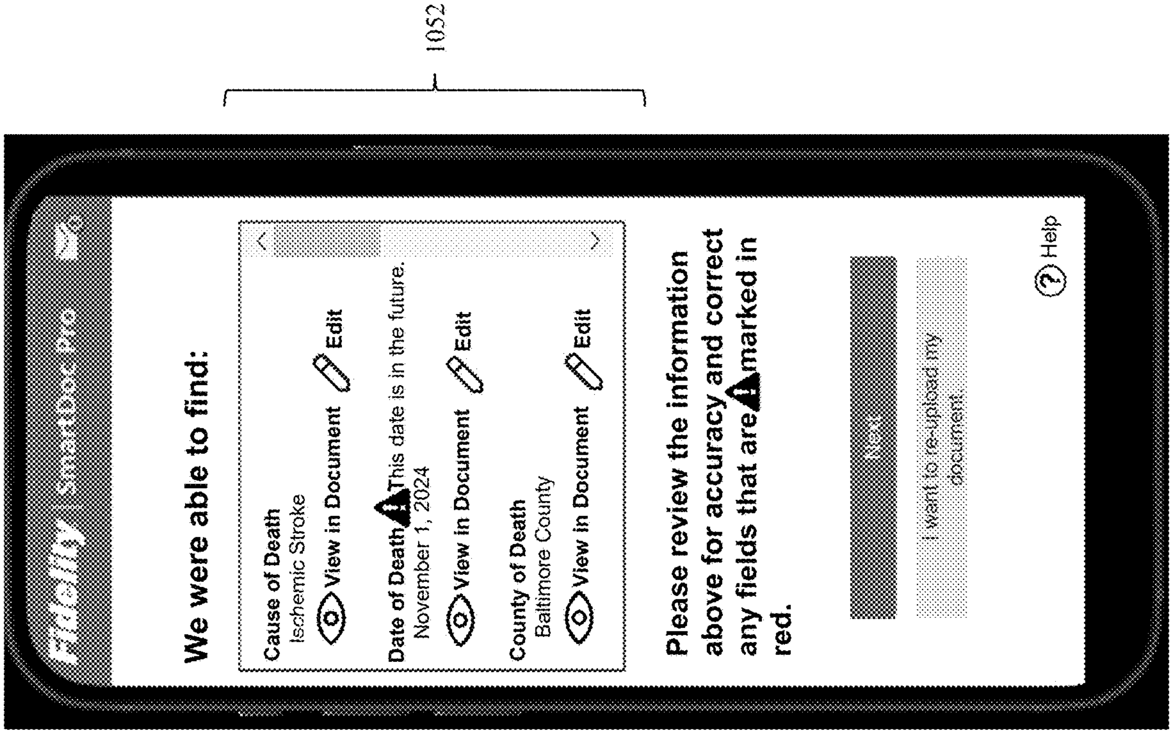
FIG. 10B is a diagram of an exemplary user interface depicting data fields and corresponding values extracted from an uploaded digital document.

FIG. 10B is a diagram of an exemplary user interface 1050 depicting data fields and corresponding values as extracted by module 112 from an uploaded digital document. As shown in FIG. 10B, user interface 1050 displays each data field and value in section 1052. Each data field includes a link for the end user to view the specific section of the uploaded document from which module 112 extracted the displayed data. Each data field also includes a link for the end user to edit the extracted data values. As shown in FIG. 10B, the date of death that module 112 identified and extracted from the digital document is erroneously listed as a future date (i.e., Nov. 1, 2024). When document validation module 114 evaluates the constraint related to validity of the date of death, module 114 resolves the constraint to 'false.' As a result, the account ownership transfer transaction cannot be completed successfully. Document validation module 114 flags the erroneous data in user interface 1050 and asks the user to review the information for accuracy and correction as needed. The end user can decide to re-upload a new capture of the death certificate so that modules 110, 112, 114 can analyze, extract, or manually key in the correct values, and validate the relevant data again.

Figure 11:
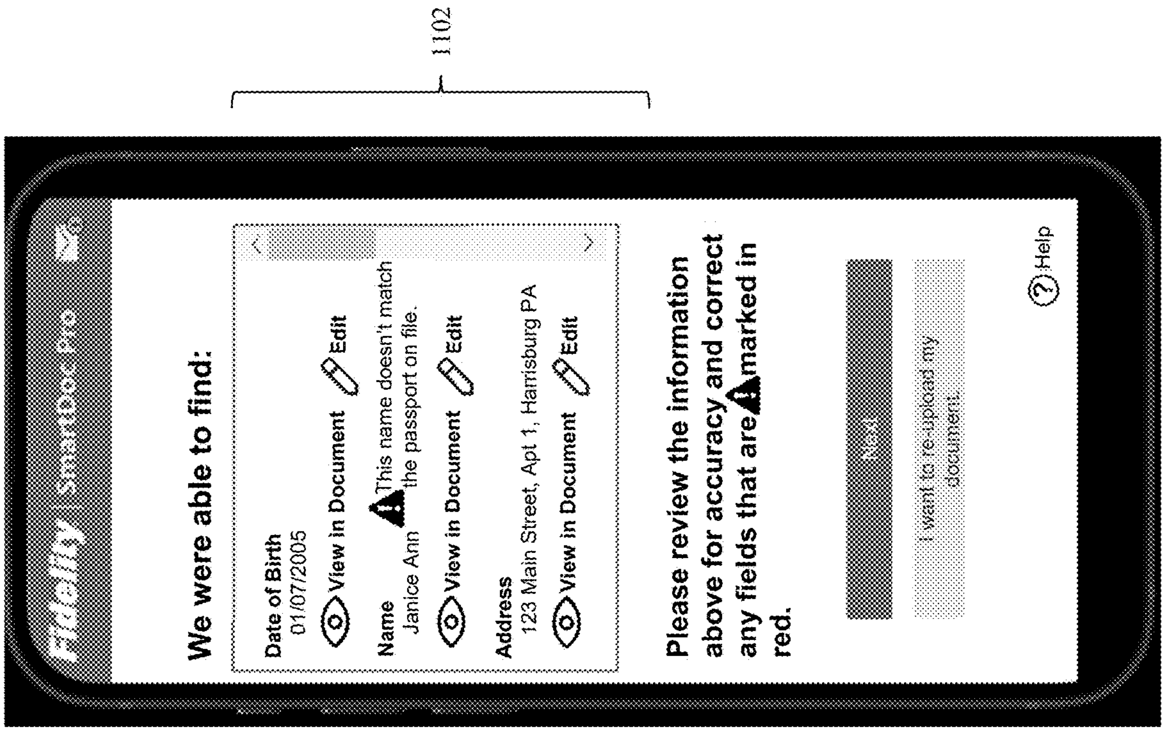
FIG. 11 is a diagram of another exemplary user interface depicting data fields and corresponding values extracted from an uploaded digital document.

Advantageously, the methods and systems described herein can perform cross-page and cross-document data comparison and validation. In some embodiments, validation of the text includes comparing text identified in one or more of the captured digital document files to determine consistency of the text across the captured digital files (and/or digital files previously captured and stored in associated with a user profile for the end user). For example, the end user may have previously provided a digital image of their passport for one transaction that was captured and stored in database server 102. When executing a subsequent transaction, the end user may decide to upload a digital image of their driver's license as proof of identity. Document validation module 114 can extract data fields (e.g., first name, last name, date of birth, etc.) from the digital files depicting the user's driver's license and the user's passport. Then, module 114 can compare the respective values for these data fields to determine whether the values match. FIG. 11 is a diagram of another exemplary user interface 1100 depicting data fields and corresponding values as extracted by module 112 from an uploaded digital document. As shown in FIG. 11, the name extracted from the uploaded document (e.g., the driver's license) does not match the name extracted from the previously stored document (e.g., the passport). When document validation module 114 evaluates a constraint related to matching the name data fields across documents, module 114 resolves the constraint to 'false.' As a result, the current transaction cannot be completed successfully. Document validation module 114 flags the erroneous data in user interface 1100 and asks the user to review the information for accuracy and correction as needed. In some embodiments, module 114 can utilize an LLM to generate the text used in the correction message based upon the resolution of the constraints. For example, if one or more of the constraints resolves to false, module 114 can provide the constraint to the LLM for generation of a constraint-specific correction message that addresses the reason for the erroneous data. The end user can decide to re-upload a new capture of the driver's license so that modules 110, 112, 114 can analyze, extract, or manually key in the correct values, and validate the relevant data again.

It should be appreciated that document validation module 114 can also compare data values extracted from the same page (and/or different pages) of a single document to confirm that the data values are consistent with each other. For example, an account ownership transfer application may include the beneficiary's name and address on page 1 and page 3 of the document. Upon module 112 extracting the data fields from each page of the document, module 114 can compare the value for the beneficiary's name from page 1 to the value from page 3 to determine whether the values match or not. If the values do not match, document validation module 114 can prompt the user to re-scan and re-submit the document or allow the user to input the correct values.

Figure 12:
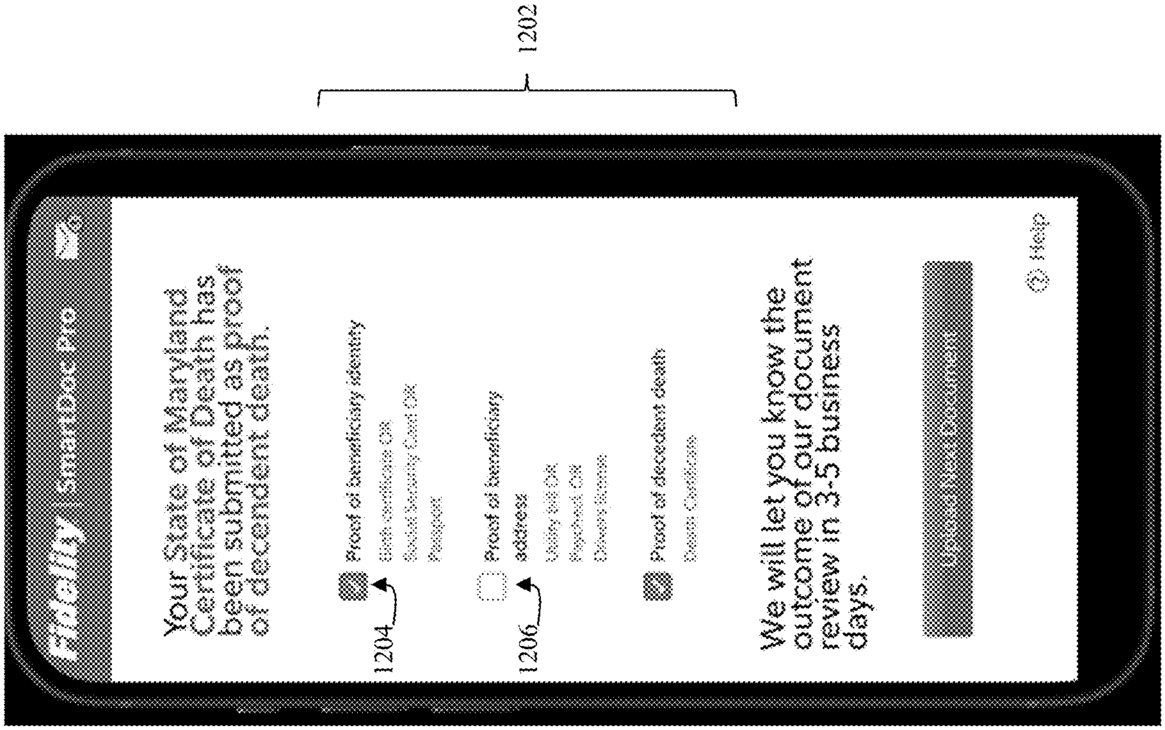
FIG. 12 is a diagram of an exemplary user interface for displaying a document validation summary screen.

Once modules 112 and 114 have completed the document upload, text identification and extraction, and data validation processes described above, workflow module 110 can instruct UI module 108 to display a document validation summary screen to the end user. FIG. 12 is a diagram of an exemplary user interface 1200 generated by UI module 108 for displaying a document validation summary screen. As shown in FIG. 12, user interface 1200 includes checklist 1202 of document types required for the transaction as well as indicia that informs the end user which document type(s) have been received (e.g., checkmark 1204) and which document type(s) are still outstanding for submission (e.g., empty checkbox 1206). The end user can proceed to upload the rest of the document(s) during the same session or save the transaction in progress for later upload.

Figure 13:
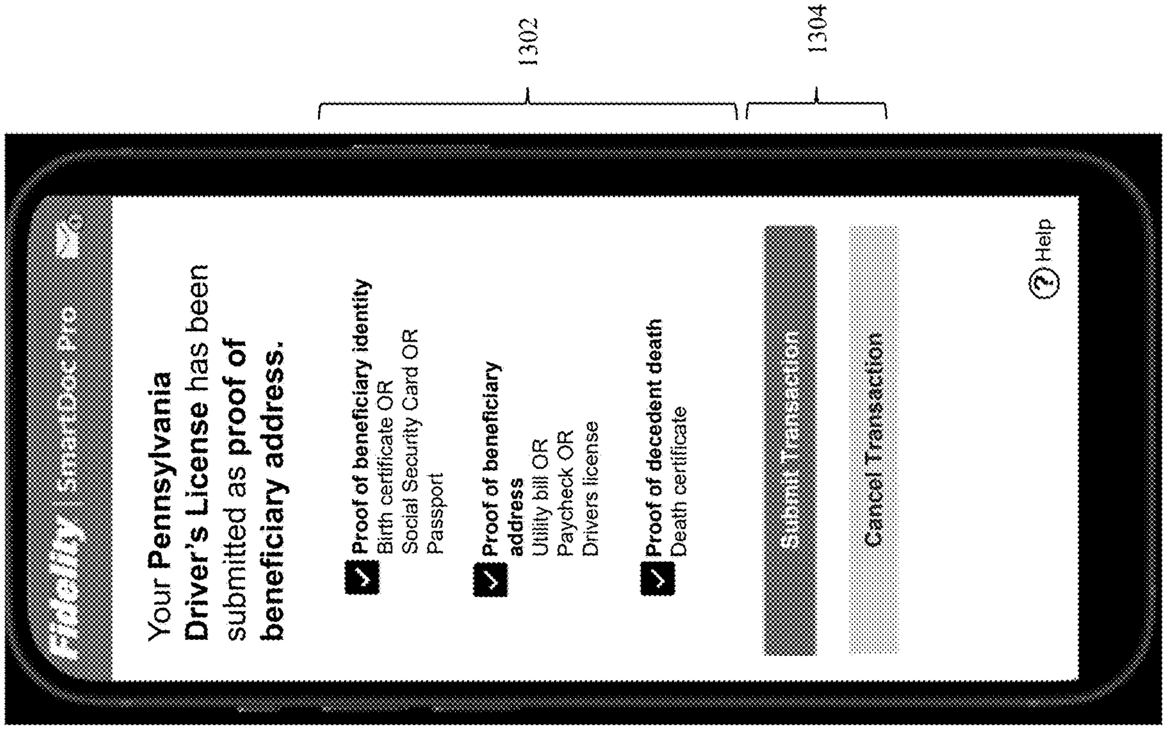
FIG. 13 is a diagram of another exemplary user interface for displaying a document validation summary screen.

FIG. 13 is a diagram of another exemplary user interface 1300 generated by UI module 108 for displaying a document validation summary screen. As shown in FIG. 13, user interface 1300 includes checklist 1302 of document types required for the transaction as well as indicia that informs the end user which document type(s) have been received. In this example, all required documents have been uploaded and validated. The end user can interact with button 1304 to submit (step 210) a transaction execution request including the associated digital files to a transaction engine when the documents have been successfully validated according to the business logic. Transaction submission module 118 generates a transaction execution message comprising a data structure with relevant transaction details and the associated digital document files and transmits the message to transaction engine 120 for processing. In some embodiments, transaction engine 120 executes the transaction upon receiving the message. In other embodiments, transaction engine 120 does not immediately execute the transaction-instead, the transaction data may be routed to a remote computing device for analysis by a transaction service representative to independently confirm that the transaction is in good order and all data fields are valid. For example, an organization may require that certain digital documents are manually inspected by an expert to ensure that the documents are legitimate and conform to the requirements of the transaction. Once the transaction is executed, transaction engine 120 returns a message to transaction submission module 118 indicating whether the transaction executed successfully or not.

Upon receiving the response from engine 120, transaction submission module 118 transmits (step 212) a response to the transaction request to the client computing device 103. In some embodiments, the response comprises a notification screen informing the end user of an outcome associated with the transaction (e.g., the transaction has been executed successfully, the documents are being separately reviewed and the outcome of this review will be communicated to the user when complete, or the transaction has been rejected due to certain reasons, etc.). In some embodiments, transaction submission module 118 stores the response to the transaction request in a mailbox or queue so that the next time the end user accesses the application from client computing device 103, the user can access the response (e.g., via accessing element 304 and/or inbox icon 310 of FIG. 3).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account—allowing access to the computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on- Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN)), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for multi-document analysis and data validation during an electronic transaction workflow, the system comprising a server computing device with a memory for storing computer-executable instructions and a processor that executes the computer-executable instructions to:

select a transaction template for a transaction request received from a remote computing device, the transaction template comprising (i) a plurality of data fields required to execute the transaction, each data field associated with one or more supporting documents and (ii) business logic for validating the supporting documents;

retrieve the business logic stored as structured and/or unstructured text and convert, by a constraint generation module of the server computing device, the business logic into a plurality of executable validation constraints, each validation constraint configured to resolve to a binary output;

for each required data field in the transaction template:

capture, via an image capture device of a mobile computing device coupled to the server computing device via a communication network, a plurality of digital files that each contain a representation of one page of a supporting document for the data field, including:

automatically calculating an image contrast level, an image brightness level, an image noise level, and an image blurriness level based upon pixel values of each digital file and determining that the calculated levels are within predefined thresholds for image legibility;

providing real-time capture feedback to the mobile computing device when one or more of the calculated levels fail to satisfy the predefined thresholds and requiring recapture of the page before further processing;

automatically detecting at least one non-text optical verification identification graphic printed on the page of the supporting document as represented in the digital image; and automatically validating (i) a location of the optical verification identification graphic on the page, (ii) a completeness of the optical verification identification graphic, and (iii) a content value of the optical verification identification graphic, identify text in each of the captured digital files that corresponds to the data field, apply the plurality of executable validation constraints to the identified text across (i) multiple pages of a same supporting document and (ii) multiple different supporting documents associated with the transaction template to determine cross-page and cross-document consistency of extracted data, and determine that each of the plurality of executable validation constraints resolves to a true output;

submit a transaction execution request including the digital files to a transaction engine only when all of the executable validation constraints resolve to the true output; and transmit a response to the transaction request to the remote computing device.

2. The system of claim 1, wherein before capturing the digital files, the server computing device determines that values for one or more of the required data fields in the transaction template are stored in a database.

3. The system of claim 2, wherein applying the plurality of executable validation constraints comprises comparing the text identified in each of the captured digital files to the stored values for the required data fields to determine consistency of the text with the stored values.

4. The system of claim 1, wherein before capturing the digital files, the server computing device determines that one or more other digital files containing a representation of one of the supporting documents for the transaction template are stored in a database.

5. The system of claim 4, wherein the server computing device:

identifies text in the stored digital files that corresponds to the data field, and applies the plurality of executable validation constraints to the text identified in the captured digital files and the stored digital files, including comparing the text identified in each of the captured digital files and the stored digital files to determine consistency of the text across all of the digital files.

6. The system of claim 1, wherein capturing one or more digital files that contain a representation of one of the supporting documents for the data field comprises:

transmitting an upload request for at least one of the digital files from the remote computing device; and receiving one or more of the digital files from the remote computing device in response to the upload request.

7. The system of claim 1, wherein the digital files received from the remote computing device comprise a digital image captured by a camera of the remote computing device or an electronic document uploaded from a storage module of the remote computing device.

8. The system of claim 7, wherein identifying text in each of the captured digital files that corresponds to the data field comprises recognizing the text in each of the captured digital files using optical character recognition (OCR).

9. The system of claim 8, wherein for each captured digital file, the server computing device classifies each page of the digital file according to a document type.

10. The system of claim 1, wherein the converting of the business logic stored as structured and/or unstructured text into the plurality of executable validation constraints is performed using one or more of a large language model or a decision tree-based system.

11. The system of claim 10, wherein when when one or more of the executable validation constraints resolve to a false output, the server computing device displays a message on the remote computing device requesting resubmission of one or more of the digital files from a user of the remote computing device.

12. The system of claim 11, wherein the message is generated by the server computing device using one or more of a large language model or a decision tree-based system as applied to the resolution of the executable validation constraints.

13. The system of claim 1, wherein before applying the plurality of executable validation constraints to the text identified in the captured digital files, the server computing device displays the identified text on the remote computing device for user review.

14. A computerized method of multi-document analysis and data validation during an electronic transaction workflow, the method comprising:

selecting, by a server computing device, a transaction template for a transaction request received from a remote computing device, the transaction template comprising (i) a plurality of data fields required to execute the transaction, each data field associated with one or more supporting documents and (ii) business logic for validating the supporting documents;

retrieving, by the server computing device, the business logic stored as structured and/or unstructured text and converting, by a constraint generation module of the server computing device, the business logic into a plurality of executable validation constraints, each validation constraint configured to resolve to a binary output;

for each required data field in the transaction template:

capturing, by the server computing device via an image capture device of a mobile computing device coupled to the server computing device via a communication network, a plurality of digital files that each contain a representation of one page of a supporting document for the data field, including:

automatically calculating an image contrast level, an image brightness level, an image noise level, and an image blurriness level based upon pixel values of each digital file and determining that the calculated levels are within predefined thresholds for image legibility;

automatically detecting at least one non-text optical verification identification graphic printed on the page of the supporting document as represented in the digital image; and automatically validating (i) a location of the optical verification identification graphic on the page, (ii) a completeness of the optical verification identification graphic, and (iii) a content value of the optical verification identification graphic, wherein validating the content value comprises decoding the optical verification identification graphic and applying at least one of the executable validation constraints to the decoded value in combination with text identified from at least one other supporting document associated with the transaction template;

identifying, by the server computing device, text in each of the captured digital files that corresponds to the data field, applying, by the server computing device, the plurality of executable validation constraints to the identified text across (i) multiple pages of a same supporting document and (ii) multiple different supporting documents associated with the transaction template to determine cross-page and cross-document consistency of extracted data, and determining, by the server computing device, that each of the plurality of executable validation constraints resolves to a true output;

submitting, by the server computing device, a transaction execution request including the digital files to a transaction engine only when all of the executable validation constraints resolve to the true output; and transmitting, by the server computing device, a response to the transaction request to the remote computing device.

15. The method of claim 14, wherein before capturing the digital files, the server computing device determines that values for one or more of the required data fields in the transaction template are stored in a database.

16. The method of claim 15, wherein applying the plurality of executable validation constraints comprises comparing the text identified in each of the captured digital files to the stored values for the required data fields to determine consistency of the text with the stored values.

17. The method of claim 14, wherein before capturing the digital files, the server computing device determines that one or more other digital files containing a representation of one of the supporting documents for the transaction template are stored in a database.

18. The method of claim 17, wherein the server computing device:

identifies text in the stored digital files that corresponds to the data field, and applies the plurality of executable validation constraints to the text identified in the captured digital files and the stored digital files, including comparing the text identified in each of the captured digital files and the stored digital files to determine consistency of the text across all of the digital files.

19. The method of claim 14, wherein capturing one or more digital files that contain a representation of one of the supporting documents for the data field comprises:

transmitting an upload request for at least one of the digital files from the remote computing device; and receiving one or more of the digital files from the remote computing device in response to the upload request.

20. The method of claim 14, wherein the digital files received from the remote computing device comprise a digital image captured by a camera of the remote computing device or an electronic document uploaded from a storage module of the remote computing device.

21. The method of claim 20, wherein identifying text in each of the captured digital files that corresponds to the data field comprises recognizing the text in each of the captured digital files using optical character recognition (OCR).

22. The method of claim 21, wherein for each captured digital file, the server computing device classifies each page of the digital file according to a document type.

23. The method of claim 14, wherein the converting of the business logic stored as structured and/or unstructured text into the plurality of executable validation constraints is performed using one or more of a large language model or a decision tree-based system.

24. The method of claim 23, wherein when one or more of the executable validation constraints resolve to a false output, the server computing device displays a message on the remote computing device requesting resubmission of one or more of the digital files from a user of the remote computing device.

25. The method of claim 24, wherein the message is generated by the server computing device using one or more of a large language model or a decision tree-based system as applied to the resolution of the executable validation constraints.

26. The method of claim 14, wherein applying the plurality of executable validation constraints to the text identified in the captured digital files, the server computing device displays the identified text on the remote computing device for user review.

* * * * *